United States Patent
Sleijster et al.

(10) Patent No.: US 12,194,398 B2
(45) Date of Patent: Jan. 14, 2025

(54) SCREENING ASSEMBLY AND PROCESS FOR SCREENING POLYMER FROM AN EFFLUENT STREAM AT REDUCED LEVELS OF POLYMER ENTRAINMENT

(71) Applicant: Borealis AG, Vienna (AT)

(72) Inventors: Henry Sleijster, Sittard-Geleen (NL); Mohammad Al-Haj Ali, Porvoo (FI); Mubashar Sattar, Porvoo (FI); Noureddine Ajellal, Porvoo (FI); Charlotta Weber, Stockholm (SE)

(73) Assignee: BOREALIS AG, Vienna (AT)

( * ) Notice: Subject to any disclaimer, the term of this patent is extended or adjusted under 35 U.S.C. 154(b) by 50 days.

(21) Appl. No.: 18/014,381

(22) PCT Filed: Aug. 5, 2021

(86) PCT No.: PCT/EP2021/071891
§ 371 (c)(1),
(2) Date: Jan. 4, 2023

(87) PCT Pub. No.: WO2022/033956
PCT Pub. Date: Feb. 17, 2022

(65) Prior Publication Data
US 2024/0009590 A1   Jan. 11, 2024

(30) Foreign Application Priority Data
Aug. 13, 2020   (EP) .................................... 20190923

(51) Int. Cl.
*B01D 3/14*     (2006.01)
*B01D 3/06*     (2006.01)
(Continued)

(52) U.S. Cl.
CPC .............. *B01D 3/148* (2013.01); *B01D 3/06* (2013.01); *B01D 53/1418* (2013.01);
(Continued)

(58) Field of Classification Search
CPC ...... B01D 3/06; B01D 3/148; B01D 53/1418; B01D 53/18; B01D 2252/205; B01D 2256/24; C08F 6/001; C08F 6/12
See application file for complete search history.

(56) References Cited

U.S. PATENT DOCUMENTS 4,408,039 A * 10/1983 Irvin .................... C08C 2/06
528/500
5,521,264 A * 5/1996 Mehra ................. C08F 6/005
95/143
(Continued)

FOREIGN PATENT DOCUMENTS

WO    2019162445 A1    8/2019

OTHER PUBLICATIONS

International Search Report of Application No. PCT/EP2021/071891 Dated Nov. 3, 2021.

*Primary Examiner* — Jonathan Miller
(74) *Attorney, Agent, or Firm* — Lippes Mathias LLP (57) ABSTRACT

The present invention is concerned with a screening assembly comprising a separating device connected to a conduit for an effluent stream comprising a polymer and a mixture of hydrocarbons, wherein the separating device is configured to separate the effluent stream into a polymer-rich stream and a polymer-lean vapor stream, wherein the first separation device comprises an inlet, a first outlet for withdrawing a polymer-rich stream, and a second outlet for withdrawing a polymer-lean vapor stream, a screening device connected to the separating device via a conduit for the polymer-lean vapor stream, wherein the screening device comprises a first inlet connected to the conduit for the polymer-lean vapor stream, a first outlet for withdrawing a cleaned vapor stream, a second outlet for withdrawing a (Continued)

polymer-comprising condensed vapor stream, and at least one second inlet for introducing a condensed vapor stream.

13 Claims, 4 Drawing Sheets

(51) Int. Cl.
  *B01D 53/14*  (2006.01)
  *B01D 53/18*  (2006.01)
  *C08F 6/00*  (2006.01)
  *C08F 6/12*  (2006.01)

(52) U.S. Cl.
  CPC .............. *B01D 53/18* (2013.01); *C08F 6/001* (2013.01); *C08F 6/12* (2013.01); *B01D 2252/205* (2013.01); *B01D 2256/24* (2013.01)

(56) References Cited

U.S. PATENT DOCUMENTS

| | | | | |
|---|---|---|---|---|
| 6,472,482 | B1* | 10/2002 | Evertz | B01J 8/006 526/348.5 |
| 7,087,685 | B2* | 8/2006 | Burns | B01J 19/1837 526/67 |
| 10,703,875 | B2* | 7/2020 | Lee | B01D 3/009 |
| 11,149,096 | B2* | 10/2021 | Al-Haj Ali | C08F 2/06 |
| 11,541,327 | B2* | 1/2023 | Ko | B01D 3/42 |
| 2004/0116626 | A1* | 6/2004 | Burns | C08F 10/02 526/70 |
| 2008/0214745 | A1* | 9/2008 | Walworth | C08F 10/02 526/348 |
| 2011/0172337 | A1* | 7/2011 | Devoy | C08F 6/12 422/138 |
| 2012/0264911 | A1* | 10/2012 | Mills | B01D 3/009 528/501 |
| 2014/0296589 | A1* | 10/2014 | Krupa | C07C 7/005 585/326 |
| 2016/0199754 | A1* | 7/2016 | Donaldson | B01D 15/3828 585/825 |
| 2018/0319949 | A1* | 11/2018 | Lee | C08F 6/06 |
| 2019/0389984 | A1* | 12/2019 | Jeong | C08F 236/06 |
| 2021/0016200 | A1* | 1/2021 | Ko | B01D 3/143 |
| 2023/0415113 | A1* | 12/2023 | Al-haj Ali | B01J 4/00 |

* cited by examiner

Figure 1a  Figure 1b

Figure 1: Screening assemblies according to the most general embodiment of the present invention without (1a) and with (1b) gas and liquid distributors.

Figure 2: Screening assemblies according to a preferred embodiment of the present invention including modifications of the polymer-comprising condensed vapor stream (e).

Figure 3: Screening assembly according to the most preferred embodiment of the present invention as regards the modifications of the polymer-comprising condensed vapor stream (e).

Figure 4: Screening assemblies according to a preferred embodiment of the present invention in view of modifications of the clean vapor stream (d) either without (4a) or with (4b) a vessel.

Figure 5: Screening assembly according to the most preferred embodiment of the present invention.

SCREENING ASSEMBLY AND PROCESS FOR SCREENING POLYMER FROM AN EFFLUENT STREAM AT REDUCED LEVELS OF POLYMER ENTRAINMENT

CROSS REFERENCE TO RELATED APPLICATIONS

This is a 371 of PCT Application No. PCT/EP2021/071891, filed Aug. 5, 2021, which claims the benefit of European Application No. 20190923.1, filed Aug. 13, 2020, the contents of which are incorporated herein in their entirety.

The present invention is concerned with a screening assembly for screening polymer from an effluent stream. Furthermore, the present invention is related to a process for screening polymer from said effluent stream. In particular, the screening assembly and the process can be used in solution polymerization processes.

BACKGROUND

Typically, in solution polymerization processes, reactors are operated with relatively low polymer concentrations in the reactor, whereby low polymer concentrations typically are considered to be lower than 30 wt % with respect to the total amount of polymer, solvent(s), monomers, and optional comonomers used.

Furthermore, reactors in solution polymerization processes are typically operated at reactor temperatures higher than in gas phase polymerization processes. The advantage of higher temperatures are higher catalyst activities and, hence, better catalytic efficiency. However, the drawbacks are that in cases where the exothermic reaction is fast, too much heat is absorbed in the reaction mixture leading to the risk of uncontrolled reactions. To control such fast exothermic reactions and uncontrolled reactions, polymer concentrations are typically within 15 to 25 wt % leading to controlled exothermic heat production.

Therefore, as a result, the effluent stream comprises respective amounts of undesired hydrocarbons, such as solvent, unreacted monomers and optionally comonomers, which have to be removed from the polymer in process steps subsequently to the polymerization reaction step.

While solution polymerization processes known in the art vary in these subsequent process steps, nearly all of them typically make use of the following steps: a) heating the polymer melt solution under pressure and b) depressurizing the solution to let volatile compounds evaporate.

Typically, such solution polymerization processes are carried out under conditions, where the reactor pressures are higher than 50 barg and the temperature at the reactor outlet is higher than 150° C. In some of the solution polymerization technologies known from the prior art, in the subsequent step, the solution stream is heated up to above 200° C. followed by a pressure drop down to vacuum levels to produce the final polymer.

Typically, such separation is carried out in a fashion that a condensed stream and a vapor stream are formed, i.e. in a flash separator. In a typical reactor assembly or process, such vapor stream from said evaporation step is condensed and fed to recovery sections. For example, it can be reused as solvent and/or as a source for unreacted monomer and/or comonomer.

In certain applications of polymer, particularly low levels of volatiles in the polymer are needed, whereby volatiles can be inter alia represented by hydrocarbons, such as solvent molecules and/or unreacted monomers or comonomers still left in the produced polymer. To achieve such low volatile levels in the polymer, multi-step evaporation processes have been developed. In particular, it is known from the art that two- or three-step evaporation processes are at least needed to reach an acceptable low level of volatiles for certain market applications of the polymer in most cases with the help of additional equipment like a devolitization extruder or kneader as a last step.

Typically, also in each step of the multi-step processes, the vapor streams are subsequently condensed and may be reused as reactor feed of the process or feed to recovery sections, where hydrocarbons, such as solvent, comonomer and monomer, are separated beforehand.

Problem to be Solved

These vapor streams can comprise polymer, which has entrained the vapor stream during the separation step. As the pressure drop in the separation step is typically large, the separation occurs so fast that fine polymer particles might be withdrawn by the evaporating material and introduced into the vapor streams. It has turned out that in particular in the first separation step, polymer entrainment occurs at high levels. This might be the case, as the amount of evaporating material is largest in the first separation step.

Fouling in the equipment subsequent to the separation step(s) can lead to reduced heat removal and reduced separation efficiency of the process section/equipment. This is in particular problematic for condensers used in subsequent steps to condense said vapor streams. The heat removal efficiency of such condensers can be significantly reduced by fouling up to total blockage of the passageway. Therefore, in cases where the vapor streams are reused as feed for the reactor, fouling of said equipment could even have an impact on temperature control of the polymerization process and production capacity of the unit. Therefore, a suitable protection against the fouling effect of polymer entrainment in the vapor streams of vapor phase/condensed phase separation steps subsequent to polymerization processes, in particular solution polymerization, is needed.

OBJECT OF THE INVENTION

In view of the problem as set out above, it is one object of the present invention to provide a screening assembly comprising a screening device, in particular a vapor phase/condensed phase screening device, for screening a polymer from an effluent stream, preferably withdrawn from a polymerization reactor, more preferably from a solution polymerization reactor, with reduced or preferably eliminated polymer entrainment.

Furthermore, also in view of the problems as described above, it is a second object of the present invention to provide a process for screening a polymer from an effluent stream from a polymerization process, in particular from a solution polymerization process, thereby reducing or eliminating polymer entrainment.

SUMMARY OF THE INVENTION

It now has surprisingly been found out that the above-mentioned objects can be achieved by combining the separation step with at least one screening step, wherein the vapor phase of the separation step is lead into the screening step, in which the vapor phase of the separation step is brought in contact with a condensed vapor phase.

Therefore, the present invention relates to a process for screening a polymer from an effluent stream comprising the polymer and a mixture of hydrocarbons, such as at least one solvent, at least one monomer and optionally at least one comonomer, the process comprising the steps of A) separating the effluent stream into a polymer-rich stream and a polymer-lean vapor stream;
B) contacting the polymer-lean vapor stream with a first condensed vapor stream, wherein the flow direction of the first condensed vapor stream is countercurrent to the flow direction of the polymer-lean vapor stream to produce a cleaned vapor stream and a polymer-comprising condensed vapor stream.

Furthermore, the present invention relates to a screening assembly comprising a separating device connected to a conduit for an effluent stream comprising a polymer and a mixture of hydrocarbons, such as at least one solvent, at least one monomer, and optionally at least one comonomer, wherein the separating device is configured to separate the effluent stream into a polymer-rich stream and a polymer-lean vapor stream, wherein the separation device comprises an inlet, a first outlet for withdrawing a polymer-rich stream, and a second outlet for withdrawing a polymer-lean vapor stream, and a screening device connected to the separating device via a conduit for the polymer-lean vapor stream, wherein the screening device comprises: a first inlet connected to the conduit for the polymer-lean vapor stream, a first outlet for withdrawing a cleaned vapor stream, a second outlet for withdrawing a polymer-comprising condensed vapor stream, and at least one second inlet for introducing a condensed vapor stream.

Finally, the present invention is directed to the use of a screening assembly according to the present invention for preventing fouling in a polymerization process, preferably a solution polymerization process.

Definitions

The term spraying as used herein has to be understood as a process step, in which a condensed phase is introduced into a gaseous phase. Thereby the condensed phase is split up in multiple droplets. This is usually done by at least one nozzle. Spraying has to be understood as a process step in which a two phase system is formed (gaseous/condensed) having a phase separating surface as high as possible.

The term condensation point as used herein has to be understood as a combination of conditions, which lead to condensation of compounds from a vaporized mixture. In particular, the condensation point depends on the pressure, the temperature and hydrocarbons, such as solvent, monomer and optionally comonomer, and any other gaseous components of the system. By varying either or both of these parameters, the condensation point can be reached.

The expression volatiles or volatile compounds as used herein has to be understood as compounds having significantly lower molecular weight in comparison to the polymer produced in the process of the invention. Such compounds typically are present in the gaseous form when being exposed to a flash separator. Commonly, the volatile compounds comprise at least one unreacted monomer, optionally unreacted comonomer, solvent(s) and any other gaseous components present in the effluent stream.

Flash separators have been known in the prior art for decades (also as low-pressure separators). As it is well known in the art, a liquid feed is passed to a flash vessel operated at a reduced pressure. Thereby a part of the liquid phase vaporizes and can be withdrawn as an overhead stream (or a vapor stream) from the low pressure separator. The part remaining in liquid phase is then withdrawn as a bottom stream or a liquid stream from the flash vessel. Operating the low pressure separator under conditions such that both vapor and liquid phases are present in the flash vessel describes this situation.

The term washing column as used herein denotes a vessel allowing for contacting a vapor stream and a liquid stream, whereas the liquid stream travelling from top to bottom and partly evaporating on the way and the vapor stream travelling from bottom to top and partly condensating on the way. The particles/droplets which are present in the vapor stream are washed by the liquid falling down to the bottom. A washing column is usually operated to have a liquid reservoir at the bottom section held at the boiling point to ensure a vapor stream in case the input vapor stream is reduced. Furthermore, a washing column can include distribution means for both streams, i.e. liquid and vapor distribution means. Washing columns can be packed beds to reduce entrainments in the vapor stream The term separation efficiency as used herein is defined as the mass flow of the component withdrawn in the polymer-lean stream or vapor stream divided by the (theoretical) mass flow rate of the component in the polymer-lean stream or condensed stream in equilibrium conditions.

The term 'screening' as used herein denotes the process of removing partially or fully solids from fluids.

DESCRIPTION OF THE DRAWINGS

FIG. 1 shows a schematic layout of a screening assembly and a process according to the most general embodiment of the present invention, wherein a washing column without gas and liquid distributors (FIG. 1a) and with gas and liquid distributors (FIG. 1b) is used as screening device.

FIG. 2 shows a schematic layout of a screening assembly and a process according to FIG. 1 with several modifications using the polymer-comprising condensed vapor stream.

FIG. 4 shows a schematic layout of a screening assembly and a process according to FIG. 1, wherein the clean vapor stream withdrawn from the top of the washing column is condensed and reintroduced either without (FIG. 4a) or with using a pump and a vessel (FIG. 4b).

REFERENCE SIGNS 1 polymerization reactor
2 separating device
3 screening device 4 first inlet of (3)
5 first outlet of (3)
6 second outlet of (3)
7 first second inlet of (3)
8 second second inlet of (3)
9 third inlet of (3)
10a first liquid distributor
10b second liquid distributor
11a first gas distributor
11b second gas distributor
12 first pump
13 heater
14 condenser
15 vessel
16 second pump
17 liquid level of condensed vapor composition
Q1 first source of condensed vapor
Q2 second source of condensed vapor
Q3 third source of condensed vapor
Q4 fourth source of condensed vapor
a effluent stream
b polymer rich stream
c polymer-lean vapor stream
d clean vapor stream
e polymer-comprising condensed vapor stream
f first condensed vapor stream
g second condensed vapor stream
h heated condensed vapor stream
i spraying condensed vapor stream
j recycle condensed vapor stream
k clean vapor purge stream

DETAILED DESCRIPTION OF THE INVENTION

Figure 1A:
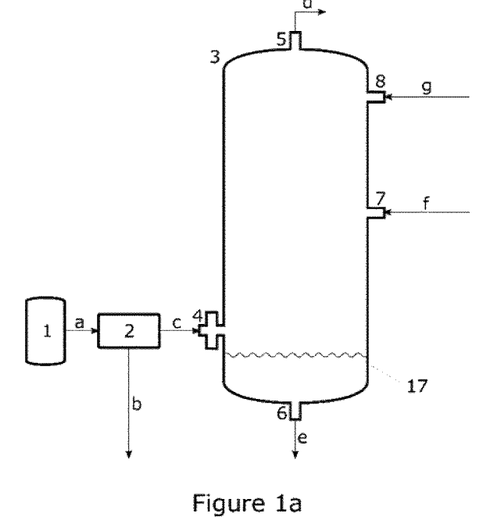

In the following, the invention is described in detail based on the Figures and the embodiments found herein.
Screening Assembly According to the Invention
Screening Assembly According to FIG. 1a
In the most general embodiment of the invention as depicted in FIG. 1a, a screening assembly is provided comprising
   a separating device (2) connected to a conduit for an effluent stream (a) comprising a polymer and a mixture of hydrocarbons, such as at least one solvent, at least one monomer, and optionally at least one comonomer, wherein the separating device (2) is configured to separate the effluent stream (a) into a polymer-rich stream (b) and a polymer-lean vapor stream (c), wherein the first separation device (2) comprises an inlet, a first outlet for withdrawing a polymer-rich stream (b), and a second outlet for withdrawing a polymer-lean vapor stream (c)
   a screening device (3) connected to the separating device (2) via a conduit for the polymer-lean vapor stream (c), wherein the screening device (3) comprises:
   a first inlet (4) connected to the conduit for the polymer-lean vapor stream (c), a first outlet (5) for withdrawing a cleaned vapor stream (d),
   a second outlet (6) for withdrawing a polymer-comprising condensed vapor stream (e), and
   at least one second inlet (7, 8) for introducing a condensed vapor stream (f, g).
Preferably, the effluent stream is withdrawn from a polymerization reactor (1), more preferably from a solution polymerization reactor.

Preferably, the polymer is a polyolefin homo- or copolymer, more preferably a polyethylene or polypropylene home- or copolymer.

The screening assembly ensures that the polymer-lean vapor stream (c) from the separating device (2) is contacted with condensed vapor composition introduced via the at least one second inlet (7, 8) for introducing a condensed vapor stream (f, g). Contacting the polymer-lean vapor stream (c) and the condensed vapor stream (f, g) has the advantage that polymer entrained into the polymer-lean vapor stream (c) in the separating device (2) can effectively be removed from the polymer-lean vapor stream (c) resulting in a clean vapor stream (d) as can be withdrawn from the first outlet (5).

Preferably, the polymer-rich stream (b) is used to withdraw a stream with comprising the final polymer. To reach certain qualities of polymer further subsequent steps as purge bins might still be needed.

Preferably, the polymer-comprising condensed stream (e) can be purged. In such a case to retrieve the final polymer from that stream, subsequent separation steps are still needed.

Preferably, the clean vapor stream (d) is used to purge volatile compounds.

Preferably, the polymer-lean vapor stream (c) produced in the separating device (2) is overheated. This is due to the conditions typically used in such separation steps. Preferably, temperatures used in the separating device (2) are between 100 and 400° C., preferably between 130 and 300° C., more preferably between 170 and 250° C. Furthermore, the pressure drop with relation to the pressure in the effluent stream (a) is preferably more than 30 barg, preferably more than barg and most preferably more than 90 barg. Hence, the conditions as found in the polymer-lean vapor stream (c) are set that the mixture of hydrocarbons, i.e. the solvent, unreacted monomer and/or comonomer, is at a temperature higher than its condensation point. Therefore, the mixture of compounds in the polymer-lean vapor stream (c) is preferably found in gaseous form.

It has now been found out that by contacting condensed vapor composition comprising the mixture of hydrocarbons, such as at least one solvent comprising the at least one monomer and optionally the at least one comonomer, with the polymer-lean vapor stream (c), entrained polymer in the polymer-lean vapor stream (c) can be effectively removed. Without being bound to theory it is believed that the condensed phase adheres to the polymer particles and makes them heavier. Therefore, they sink down into the condensed vapor phase. Furthermore, the high temperature of the condensed phase prevents "sticking" of high concentration polymer to the walls or internals of the equipment.

In a preferred general embodiment of the invention the screening device (3) comprises at least one liquid distributor (10) and/or at least one gas distributor (11). These distributors ensure that the distribution of both the gas and the liquid are maximized. These maximized distributions lead to increased contact between the polymer-lean vapor stream (c) and the at least one condensed vapor stream (f, g). Increased contact, however, leads to improved removal of entrained polymer from the vapor stream.

A gas or a liquid distributor could be an open packing within the flow path of the stream to be distributed. Typically the screening device is filled with a metal random packing (e.g. ITMP from Koch-Glitsch) between the liquid distributor on top and a gas distributor on the bottom. Preferably, the packing should still ensure high circulating flow. In a top section of the washing column, clean liquid will wash the vapor stream as a second step.

Preferably, the first separation device (2) is a flash separator.

Preferably, the screening device (3) is a washing column.

Figure 1B:
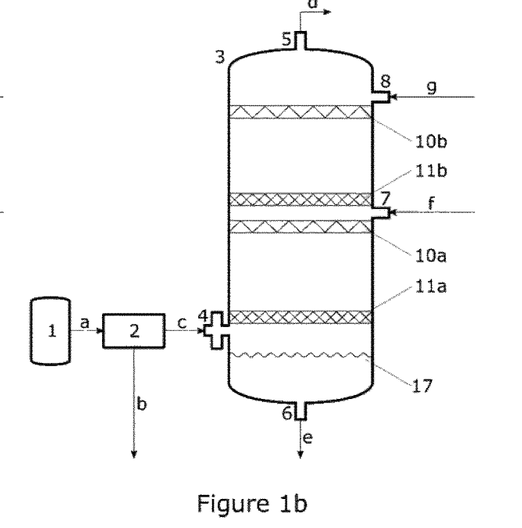

Screening Assembly According to FIG. 1b

Therefore, in a preferred embodiment of the invention such as depicted in FIG. 1b, the screening assembly further comprises a first liquid distributor (10a) positioned above the first inlet (4) and below the at least one second inlet (7, 8) with respect to the height of the screening device (3).

Furthermore, the screening assembly according to the preferred embodiment of the invention such as depicted in FIG. 1b further comprises a first gas distributor (11a) positioned above the first inlet (4) and below the at least one second inlet (7, 8) with respect to the height of the screening device (3).

Preferably, in the screening assembly according to the preferred embodiment of the invention such as depicted in FIG. 1b, the first gas distributor (11a) is further positioned above the first inlet (4) and below the first liquid distributor (10a) with respect to the height of the screening device (3).

The described positioning of the first liquid distributor (10a) and the first gas distributor (11a) ensures that the contact between the vapor stream and the condensed vapor stream is maximized.

It should be understood that the distributors are not limited in number. Hence, there can be more than one distributor between inlets or between the top and the bottom. For example in case the distances between the inlets are large and the distribution effect is lost along the way either of the vapor traveling up or the liquid falling down, a second or even more distributors along that way might be useful to keep both phases distributed and thereby enhance the washing effect.

Usually one liquid distributor is installed below an inlet and a vapor distributor is installed above an inlet. Preferably, in case more than two packing sections are applied, the packing section consists of a gas distributor on the bottom with optionally a section of metal random packing above and a liquid distributor on top. Such a setup ensures that the gas entering the section from the bottoms is distributed and the liquid entering the section from the top is also distributed leading to a maximized distributed contacting of gas and liquid in the section.

However, in a more preferred general embodiment of the invention, the at least one second inlet (7, 8) comprises a first second inlet (7) for introducing a first condensed vapor stream (f), and a second second inlet (8) for introducing a second condensed vapor stream (g), wherein the first second inlet (7) is positioned above the first inlet (4) and below the second second inlet (8) with respect to the height of the screening device (3), and wherein the second second inlet (8) is positioned above the first second inlet (7) and below the first outlet (5) with respect to the height of the screening device (3). This assembly provides two regimes of contacting, i.e. between the first inlet (4) and the first second inlet (7) and between the first second inlet (7) and the second second inlet (8). In each of these regimes the contacting can be individually adjusted by the nature of the first and the second condensed vapor streams (f, g) and gas and liquid distributors used. The gas and liquid distributors can be inter alia adjusted by the type of optional metal random packing used therein. In particular the density of the packing can be used for adjustment. Gas and liquid distribution can be adjusted by the design of the respective distributor. Different geometrical variables of the packing material influence the distribution quality along the bed. Among these variables are the ratio of column diameter/pack height, the crimp height and angles and the packing sheet surface (smooth, grooved, punched). Open packings result in lower pressure drops, but less distribution, while higher density packings result in higher pressure drops, but increased distribution.

Therefore, the screening assembly of such a more preferred general embodiment can further comprise a second liquid distributor (10b) positioned above the first liquid distributor (10a) and below the first outlet (5) with respect to the height of the screening device (3).

Moreover, the screening assembly of such a more preferred general embodiment can further comprise a second gas distributor (11b) positioned above the first liquid distributor (10a) and below the first outlet (5) with respect to the height of the screening device (3).

Finally, in a screening assembly of such a more preferred general embodiment the second gas distributor (11b) can further be positioned above the first liquid distributor (10a) and below the second liquid distributor (10b) with respect to the height of the screening device (3).

These gas and liquid distributors can be provided and adjusted as needed. However, in FIG. 1b a respectively preferred general embodiment comprising first and second gas and liquid distributors is depicted.

It has now been further found out that by spraying condensed vapor composition comprising the mixture of hydrocarbons, such as at least one solvent comprising the at least one monomer and optionally at least one comonomer, into the polymer-lean vapor stream (c), entrainment into the clean vapor stream of the screening device can be further significantly reduced. Without being bound to theory it is believed that the condensed phase adheres to the polymer particles and makes them heavier. Therefore, they are further removed from the vapor phase. Furthermore, the high temperature of the condensed phase prevents "sticking" of high concentration polymer to the walls or internals of the equipment. It is further believed that the spraying has two effects in comparison to merely contacting the polymer-lean vapor stream (c) and the condensed vapor stream (f, g) as shown in the general embodiments according to FIGS. 1a and 1b. First, the condensed phase itself already provides said effect. Second, however, the mixture found in the polymer-lean vapor stream (c) is cooled down to eventually reach its condensation point. Therefore, even more condensed phase is produced by condensation of the vapor stream itself, further enhancing the effect of reducing the entrainment.

Screening Assemblies According to FIG. 2

Therefore, in a preferred embodiment of the screening assembly of the invention according to FIG. 2, the first inlet (4) of the screening device (3) is configured for spraying condensed vapor into the polymer-lean vapor stream (c).

The condensed vapor stream used for spraying into the polymer-lean vapor stream (c) generally can be provided from any source. Hence, in the preferred embodiment according to FIGS. 2a-d, a first source of condensed vapor composition (Q1) is connected to the first inlet (4) for spraying into the polymer-lean vapor stream (c).

Each of the specific embodiments of FIGS. 2a-d as described in the following discloses a modification of the condensed vapor stream (e) comprising polymer. It should be understood that in each of these embodiments a certain stream ((i), (f), (j) or (h)) is withdrawn from stream (e). Therefore, parts of (e) are used for each of the recycle measures, but (e) can still be withdrawn from the screening device (3) for purging.

Figure 2A:
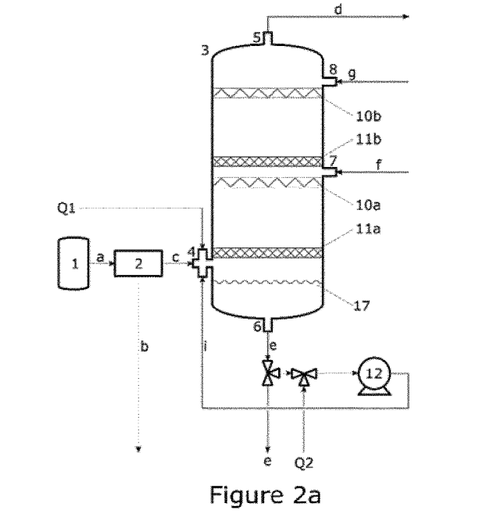
FIG. 2a shows a modification, in which part of the polymer-comprising condensed vapor stream is recycled as spraying liquid in the polymer-lean vapor stream entering the washing column.

Screening Assembly According to FIG. 2a

However, alternative embodiments of the screening assembly according to the invention are also conceivable. In a preferred embodiment of the screening assembly of the invention according to FIG. 2a, not only the first source of condensed vapor composition is connected to the first inlet (4), but also a spraying condensed vapor stream (i). It should be understood that, while in FIG. 2a the combination of both connections is shown, the connection to the first source of condensed vapor composition (Q1) is optional.

Hence, the preferred embodiment of the present invention according to FIG. 2a relates to a screening assembly according to FIG. 1b, wherein the polymer-comprising condensed vapor stream (e) connected to the second outlet (6) and a spraying condensed vapor stream (i) sprayed into the polymer-lean vapor stream (c) are fluidly connected, preferably fluidly connected via pump (12). Usually, the condensed vapor composition must again be compressed to match the pressure as found in the polymer-lean vapor stream (c) as withdrawn from the separating device (2) before being sprayed into polymer-lean vapor stream (c). While a first source of fresh condensed vapor phase (Q1) could also be optionally fluidly connected to the polymer-comprising condensed vapor stream (e), it should be understood that the embodiment without such a source is preferred.

The preferred embodiment including the at least partially recirculation of condensed vapor stream (e) and subsequent spraying of the condensed vapor composition of said stream into the polymer-lean vapor stream (c) via a conduit for the spraying condensed vapor stream (i) and the first inlet (4) has the advantage that no or less fresh condensed vapor composition has to be introduced into the screening device (3) for spraying. As a result, material and energy is saved. Especially, as the spraying condensed vapor stream (i) still has elevated temperature, there is no need to heat it up again. Nevertheless, as the recirculated composition is already condensed, the temperature is also not too high, but ensures reliably that the polymer-lean vapor stream can reach its condensation point.

Preferably, in the preferred embodiment according to FIG. 2a, a second source of condensed vapor composition (Q2) is connected to the polymer-comprising condensed vapor stream (e). Such an embodiment has the advantage that the polymer-comprising condensed vapor stream (e) can be diluted, thereby adjusting the temperature and/or the composition/concentration in the polymer-comprising condensed vapor stream (e).

However, other recirculation scenarios of the polymer-comprising condensed vapor stream are conceivable, which can either be used solely or in combination. These are described in FIGS. 2b-d.

Figure 2B:
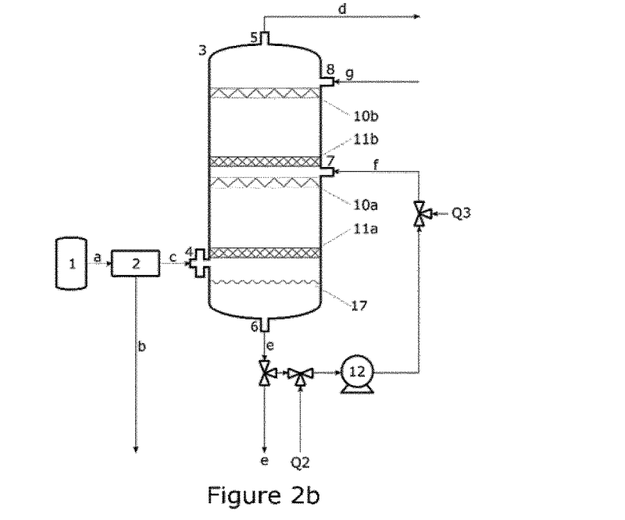
FIG. 2b shows a modification, in which part of the polymer-comprising condensed vapor stream is recycled as washing liquid in the washing column.

Screening Assembly According to FIG. 2b

In the preferred embodiment according to FIG. 2b, in the screening assembly according to FIG. 1a or 1b are modified in that the polymer-comprising condensed vapor stream (e) connected to the second outlet (6) and the first condensed vapor stream (f) connected to the first second inlet (7) are fluidly connected, preferably fluidly connected via pump (12). Usually, the condensed vapor composition must again be compressed to match the pressure as found in the screening device (3). While FIGS. 2a to 2d all show the additional features of FIG. 1b, it should be understood that the additional features of 2a to 2d are combinable and therefore herewith disclosed in combination with both embodiments of FIGS. 1a and 1b.

Also in this preferred embodiment a second source of fresh condensed vapor phase (Q2) can be fluidly connected to a conduit for the clean condensed vapor stream (e) for the same advantages as set out above.

Furthermore, in this preferred embodiment a third source of fresh condensed vapor phase (Q3) can be fluidly connected to a conduit for the first condensed vapor stream (f). In some embodiments, Q3 can be used as a make-up stream, i.e. a compensation stream, if disturbances during operation occur.

The advantage of this embodiment is comparable to the advantage of the embodiment according to FIG. 2a. While the purpose of the recirculated stream is related to being contacted with the polymer-lean vapor stream (c) in the screening device (3) for the removal of entrained polymer, also in this embodiment the advantage is that no or less fresh condensed vapor composition has to be introduced into the screening device (3). As a result, material and energy is saved. Especially, as the first condensed vapor stream (f) still has elevated temperature, there is no need to heat it up again. Nevertheless, as the recirculated composition is already condensed, the temperature is also not too high, but ensures that entrained polymer is reliably removed from the polymer-lean vapor stream (c).

Figure 2C:
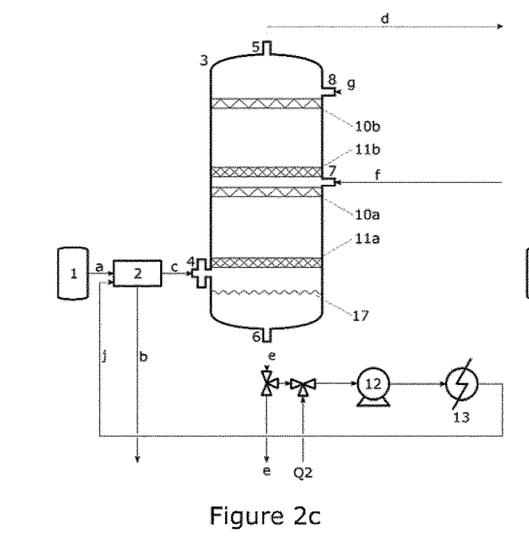
FIG. 2c shows a modification, in which part of the polymer-comprising condensed vapor stream is recycled in the separating device.

Screening Assembly According to FIG. 2c

In the preferred embodiment according to FIG. 2c, the screening assembly according to FIG. 1a or 1b are modified in that the polymer-comprising condensed vapor stream (e) connected to the second outlet (6) and a recycle condensed vapor stream (j) connected to the separating device (2) are fluidly connected, preferably fluidly connected via pump (12) and heater (13). Usually, the condensed vapor composition must again be compressed to match the pressure as required for separation in the separating device (2). Furthermore, separation in the separating device (2) also usually requires that the temperature of the condensed vapor composition in the recycle condensed vapor stream (j) is increased.

Also in this preferred embodiment a second source of fresh condensed vapor phase (Q2) can be fluidly connected to the clean condensed vapor stream (e) for the same advantages as set out above.

The advantage of this preferred embodiment is that at least parts of the polymer-comprising condensed vapor stream (e) are recycled back into the separating device (2). Hence, such a setup increases the overall separation efficiency of the combined first and screening devices. Furthermore, it removes the requirement of separating polymer and volatiles in the polymer-comprising condensed vapor stream (e).

Figure 2D:
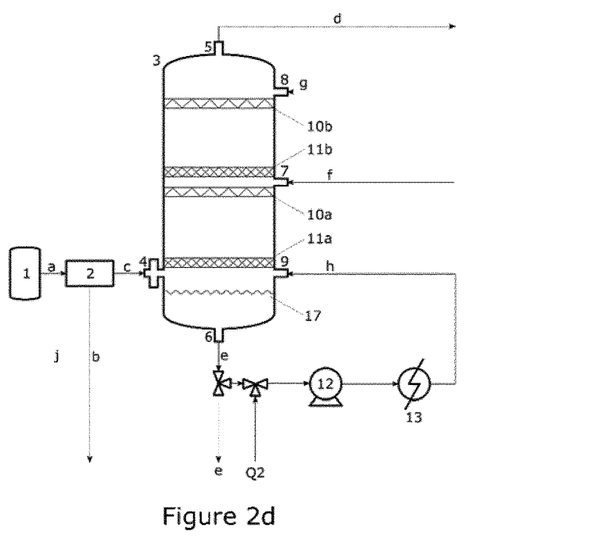
FIG. 2d shows a modification, in which part of the polymer-comprising condensed vapor stream is used to control the temperatures of the condensed vapor composition in the screening device.

Screening Assembly According to FIG. 2d

The screening assembly according to FIG. 2d further comprises a third inlet (9) for introducing a heated condensed vapor stream (h). In one embodiment, in this third inlet (9) a fresh heated condensed vapor stream (h) could be introduced. However, in a preferred embodiment, in the screening assembly according FIG. 2d polymer-comprising condensed vapor stream (e) connected to the second outlet (6) and the heated condensed vapor stream (h) connected to the third inlet (9) are fluidly connected, preferably fluidly connected via pump (12) and heater (13). Usually, the condensed vapor composition must again be compressed to match the pressure in the screening device (3). In another embodiment, the setup of FIG. 2d can also be provided without heater (13).

Also in this preferred embodiment a second source of fresh condensed vapor phase (Q2) can be fluidly connected to the clean condensed vapor stream (e) for the same advantages as set out above.

The advantage of the screening assembly according to FIG. 2d is that the conditions within the screening device (3) can be controlled. It is advantageous to keep the condensed vapor composition present in the screening device (3), the upper phase limit being indicated by (17), at the temperature of the boiling point. This ensures better vapor transportation and in particular increased separation efficiency. If the condensed vapor composition is not boiling, more vapor will be withdrawn from the screening device in condensed form, while it is preferred to withdraw as much as possible volatile compounds in the gaseous form to separate them from the polymer.

Figure 3:
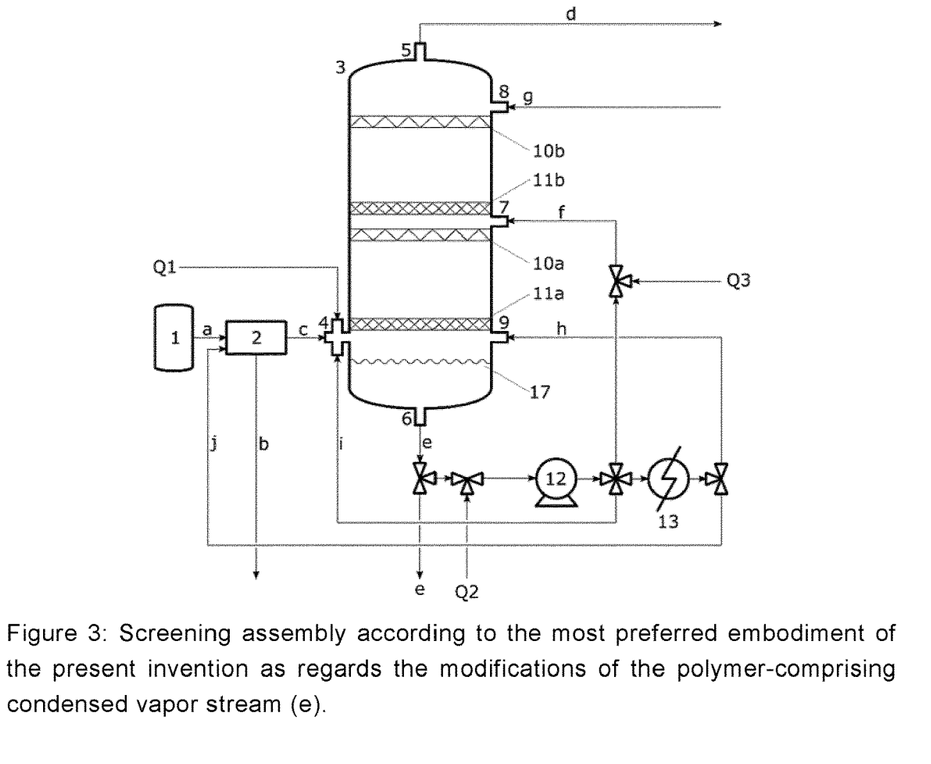
FIG. 3 shows a combination of all modifications presented in FIGS. 2a-d.

Screening Assembly According to FIG. 3

It should be understood that all of the embodiments can be combined together without any drawbacks. Such a preferred embodiment is depicted in FIG. 3. In such a preferred embodiments, the flow rates in the individual streams (f, h, i, j) can be controlled by valves. Hence, it is the combined advantage of this embodiment of the screening assembly of the invention that, depending on the conditions to be found in the first and screening device, the flow rates can be adjusted to control these conditions. For example, in case the temperature of the condensed vapor composition in the screening device (3) decreases below the boiling point of the vapor composition, the flow rate of the heated condensed vapor stream (h) introduced into the third inlet (9) could be increased, resulting in an increase of the temperature of the condensed vapor composition in the screening device (3). Likewise, the flow rate of the spraying condensed vapor composition could be increased in case the vapor composition in the polymer-lean stream (c) does not reach its condensation point when entering the screening device (3). The flow rate of the first condensed vapor stream (f) could be increased in case the separation efficiency of the screening device (3) should be increased, i.e. in case the clean vapor stream (d) still comprises too much polymer. Hence, this embodiment allows for versatile control of the reaction conditions in the screening assembly according to the invention.

Screening Assemblies According to FIG. 4

Figure 4A:
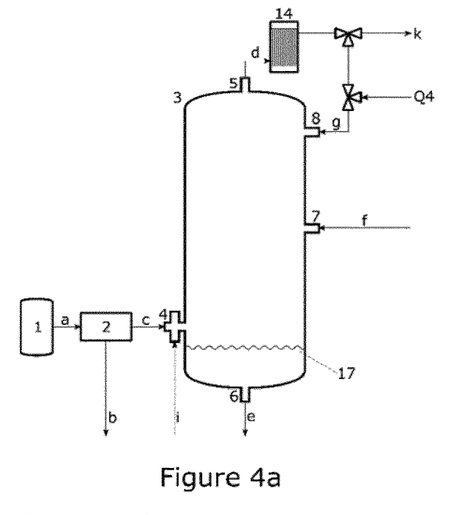

The embodiment according to FIGS. 4a and 4a exemplify screening assemblies according to the invention in view of modifications of the clean vapor stream (d) and the second condensed vapor stream (g). While these embodiments are depicted in relation to the most general embodiment according to FIG. 1a, it should be understood that the modifications shown in the embodiments of FIGS. 4a and 4b could also be combined with i.e. any of the embodiments shown in FIG. 1b, FIGS. 2a-d and FIG. 3.

Screening Assembly According to FIG. 4a

The screening assembly according to the preferred embodiment of the invention according to FIG. 4a further comprises a condenser (12) comprising an inlet and an outlet, wherein the first outlet (5) is fluidly connected to the inlet of the condenser (14) via a conduit for the clean vapor stream (d), wherein the outlet of the condenser (14) is fluidly connected to the second second inlet (8) via a conduit for the second condensed vapor stream (g).

Preferably, in the screening assembly according the embodiment of FIG. 4a a fourth source of fresh condensed vapor phase (Q4) is fluidly connected to the second condensed vapor stream (g). This fourth source of fresh condensed vapor phase (Q4) allows the control of the second condensed vapor stream (g) in view of temperature and composition.

The general advantage of the preferred embodiment according to FIG. 4a is that at least parts of the clean vapor composition stream (d) are recycled back into the second condensed vapor stream (g). The second condensed vapor stream (g) is used to provide the second contacting step between the polymer-lean vapor stream (c) and a condensed vapor stream to remove polymer still present in the polymer-lean vapor stream (c). By recycling part of the clean vapor stream (d) not only the need of an extra import of fresh condensed vapor composition is reduced, but also the energy withdrawn from the system by the clean vapor stream (d) is at least partially returned to the screening device (3).

Figure 4B:
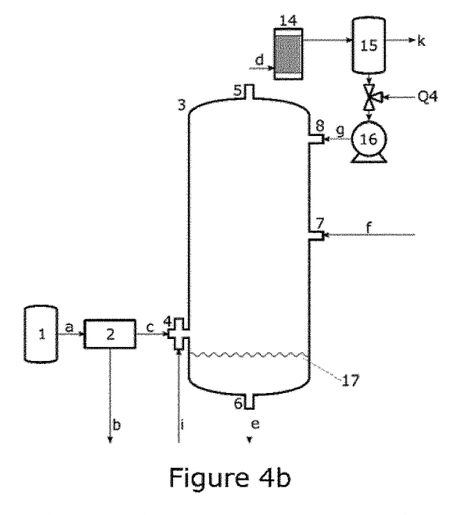

Screening Assembly According to FIG. 4b

Furthermore, preferably, the screening assembly according to the embodiment of FIG. 4b comprises a vessel (15) comprising an inlet, a first outlet and a second outlet, wherein the inlet is fluidly connected to the outlet of the condenser (14) and the first outlet is fluidly connected to the second condensed vapor stream (g). The second outlet of the vessel (15) preferably is suitable for withdrawing a clean condensed vapor phase (k).

The vessel (15) forms a reservoir for the clean condensed vapor stream (d), which further ensures reliable operability of the screening assembly.

Preferably, in the screening assembly according the embodiment of FIG. 4b a fourth source of fresh condensed vapor phase (Q4) is fluidly connected to the second condensed vapor stream (g). This fourth source of fresh condensed vapor phase (Q4) allows the control of the second condensed vapor stream (g) in view of temperature and composition.

The screening assembly according FIG. 4b further comprises a pump (16) comprising an inlet and an outlet, wherein the inlet is fluidly connected to the outlet of the condenser (14) and the outlet is fluidly connected to the second condensed vapor stream (g).

Figure 5:
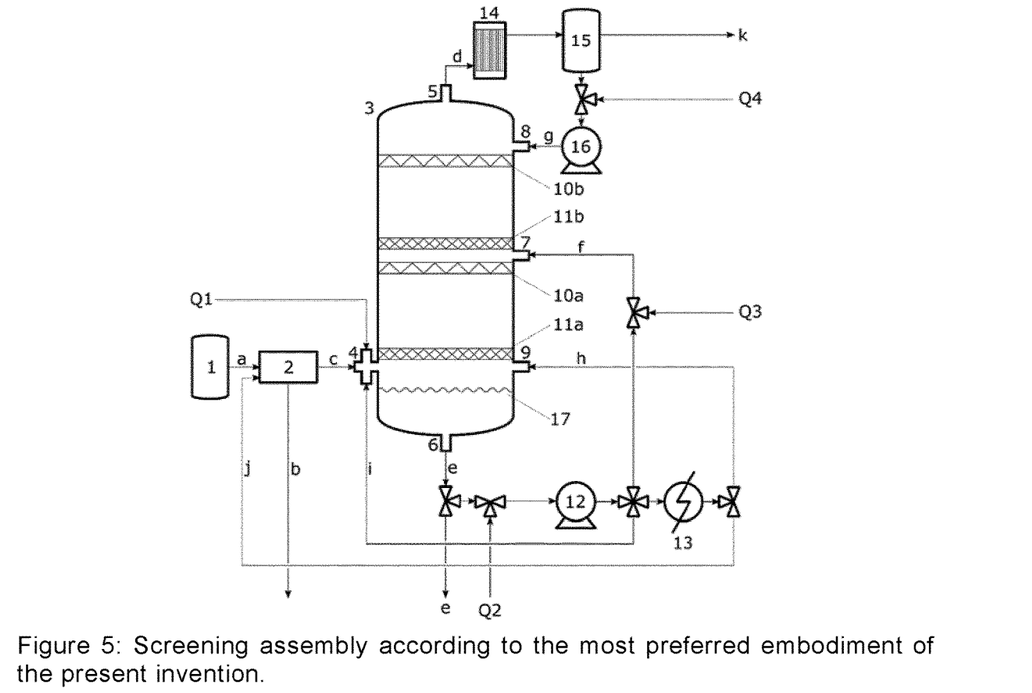
FIG. 5 shows a combination of the embodiments found in FIGS. 3 and 4.

Screening Assembly According FIG. 5

FIG. 5 shows the most preferred embodiment of the screening assembly of the present invention, which combines the modifications of the polymer-comprising condensed vapor stream (e) according to the embodiments according to FIGS. 2a-d, as well as the modifications of the clean vapor stream (d) according the embodiments according to FIGS. 4a and 4b. Furthermore, the screening device (3) of this embodiment combines the gas and liquid distributors as described in the embodiment according to FIG. 1b having an optional metal random packing section between the liquid and gas distributors. Consequently, the screening device (3) used in the embodiment according to FIG. 5 is a washing column. Preferably, the separating device (2) used in the embodiment according to Figure is a flash separator.

Further Screening Assemblies

In also preferred embodiments, more than one screening device (3) can be used, preferably connected in series. In such a screening assembly, the clean vapor stream (d) of the first screening device (3) is connected to the first inlet (4) of the screening device and so forth. While in theory many screening devices could be connected in series, it has turned out that already with a second screening device a significant increase in separation efficiency could be obtained. Therefore, in a most preferred embodiment, the screening assembly comprises a first separation device (2), preferably a flash separator, a first screening device (3), preferably a first washing column, and a serially connected second screening device (3), preferably a second washing column. It should be understood that in a polymerization reactor assembly several separation devices, i.e. flash separators, can be used. The present invention, i.e. the screening device of the present invention, can be applied after each of such separation devices.

Process According to the Invention

The process of the present invention is directed to screening polymer from an effluent stream (a), preferably withdrawn from a polymerization reactor.

Polymerization Process

The effluent stream could be prepared using any process for the production of a polymer, which requires the subsequent separation of volatile compounds from the polymer after production. Preferably, the present invention is applicable for supercritical, solution and advanced solution polymerization processes. More preferably are continuous supercritical, solution and advanced solution polymerization processes. Most preferably, the production process comprises a continuous solution polymerization process.

The polymer produced in the present invention can be any polymer, for the production of which volatile compounds are used. Preferably, the polymer produced in the present invention is an olefin homo- or copolymer. More preferably, the monomer of this polymer is selected from an α-olefin having a carbon atom number of 2 to 4, preferably ethylene, propylene, 1-butene, most preferably from ethylene. Most preferably, the polymer is a polyethylene copolymer or homopolymer.

In case the polymer is a copolymer, the comonomer preferably is different from the α-olefin monomer and is selected from the group consisting of linear and cyclic olefins and α-olefins having from 2 to 12 carbon atoms and mixtures thereof. More preferably, the comonomer is an α-olefin different from the olefin monomer and is selected from the group consisting of linear olefins having from 2 to 12 carbon atoms and mixtures thereof, preferably 4 to 10 carbon atoms, most preferably 1-octene.

In a most preferred embodiment, the polymer is produced in a solution polymerization process as disclosed in the following.

The polymerization is typically conducted in the presence of an olefin polymerization catalyst. The olefin polymerization catalyst may be any catalyst known in the art, which is capable of polymerizing the monomer and the optional comonomer. Thus, the polymerization catalyst may be a Ziegler-Natta catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244, or it may be a combination of these. Other suitable catalysts, such as late transition metal catalysts, can also be used.

In a solution polymerization process a solvent is also present. The solvent is in liquid or supercritical state in the polymerization conditions. The solvent is typically and preferably a hydrocarbon solvent. The liquid hydrocarbon solvent used is preferably a $C_{5-12}$-hydrocarbon, which may be unsubstituted or substituted by $C_{1-4}$ alkyl group such as pentane, methyl pentane, hexane, heptane, octane, cyclohexane, methylcyclohexane and hydrogenated naphtha. More preferably, unsubstituted $C_{6-10}$-hydrocarbon solvents are used.

Other components may also be added into the reactor. It is known to feed hydrogen into the reactor for controlling the molecular weight of the polymer formed during the polymerization. The use of different antifouling compounds is also known in the art. In addition, different kinds of activity boosters or activity retarders may be used for controlling the activity of the catalyst.

Typically, the content of the polymer in the effluent stream comprising the solvent, the polymer and the mixture of hydrocarbons, such as the solvent, the unreacted monomer and optionally the comonomer, is from 10 to 35 wt %, preferably from 12.5 to 25 wt %, more preferably from 15 to 25 wt %.

The effluent stream is the feed stream to the separating device. It may be the product stream from the polymerization reactor, as discussed above. The reaction mixture stream then typically has the polymer content, composition temperature and pressure as disclosed above.

Preferably, the effluent stream comprises the polymer, at least one unreacted monomer, and optionally at least one unreacted comonomer. Depending on the polymerization process the reaction mixture may further comprise at least one solvent.

Screening Process According to FIG. 1a

In the most general embodiment of the invention according to FIG. 1a, a process is provided for screening a polymer from an effluent stream (a), preferably withdrawn from the polymerization reactor (1), whereby the effluent stream (a) comprises the polymer and a mixture of hydrocarbons, such as at least one solvent, at least one monomer and optionally at least one comonomer, the process comprising the steps of A) separating the effluent stream (a) into a polymer-rich stream (b) and a polymer-lean vapor stream (c);

B) contacting the polymer-lean vapor stream (c) with a first condensed vapor stream (f), wherein the flow direction of the first condensed vapor stream (f) is countercurrent to the flow direction of the polymer-lean vapor stream (c) to produce a cleaned vapor stream (d) and a polymer-comprising condensed vapor stream (e).

Preferably, the polymer-lean vapor stream produced in step A) is overheated. This is due to the conditions typically used in such separation steps. Preferably, step A) is carried out under conditions to allow volatile compounds in the effluent stream to evaporate from the condensed phase, which mainly comprises polymer. Preferably, temperatures used in step A) are between 100 and 400° C., more preferably between 130 and 300° C., more preferably between 170 and 250° C. Furthermore, the pressure drop with relation to the pressure in the effluent stream (a) is preferably more than 30 barg, preferably more than 60 barg and most preferably more than 90 barg. Hence, the conditions as found in the polymer-lean vapor stream (c) are set that the mixture of hydrocarbons, i.e. the solvent, unreacted monomer and/or comonomer, is not at its condensation point. Therefore, the mixture of compounds in the polymer-lean vapor stream (c) is generally found to be present in gaseous form.

Therefore, preferably, step A) is carried out using a flash separator.

Preferably, the polymer is a polyolefin homo- or copolymer, more preferably a polyethylene or polypropylene home- or copolymer.

Preferably, the polymer in the effluent stream is molten. This assures best material exchange of volatile compounds evaporating from the polymer in step A).

It has now surprisingly been found out that by contacting condensed vapor composition with the polymer-lean vapor stream (c), polymer entrained into the polymer-lean vapor stream (c) can be efficiently removed.

It has been further found out that distributing either the polymer-lean vapor stream (c) and/or the condensed vapor streams leads to increased contacting and results in increased separation efficiency of the total process.

Screening Process According to FIG. 1b

Therefore, in the process according to the preferred embodiment of the invention according to FIG. 1b in step B) the first condensed vapor stream (f) is distributed using a first liquid distributor (10a).

Furthermore, preferably, in an embodiment of the process of the invention according to FIG. 1b, in the process of the invention, in step B) the polymer-lean vapor stream (c) is distributed using a first gas distributor (11a). In a preferred embodiment, the space between the first liquid distributor (10a) and the first gas distributor (11a) is filled with a metal random packing.

The distribution of the first condensed vapor stream (f) occurs preferably downstream of the distribution of the polymer-lean vapor stream (c) with respect to the flow direction of the polymer-lean vapor stream (c).

In another preferred embodiment of the process of the invention also depicted in FIG. 1b, the process further comprises the step of C) contacting the polymer-lean vapor stream (c) with a second condensed vapor stream (g) downstream to the contacting of step B) with respect to the flow direction of the polymer-lean vapor stream (c), wherein the flow direction of the second condensed vapor stream (g) is countercurrent to the flow direction of the polymer-lean vapor stream (c).

In such a preferred embodiment, in step C) the second condensed vapor stream (g) is diffused using a second liquid distributor (10b). Moreover, preferably, in step C) the polymer-lean vapor stream (c) is diffused using a second gas distributor (11b). In a preferred embodiment, the space between the second liquid distributor (10b) and the second gas distributor (11b) is filled with a metal random packing.

Hence, most preferably, in step C) the distribution of the second condensed vapor stream (g) occurs downstream of the distribution of the polymer-lean vapor stream (c) with respect of the flow direction of the polymer-lean vapor stream (c).

Screening Process According to FIG. 2a

It has now surprisingly been found out that by spraying condensed vapor composition into the polymer-lean vapor stream (c) prior to step B), polymer entrained into the polymer-lean vapor stream (c) can be further significantly removed.

Therefore, in a preferred embodiment of the process of the invention according to FIG. 2a, in the process a condensed vapor composition comprising the mixture of hydrocarbons, such as at least one solvent comprising the at least one monomer and optionally the at least one comonomer, is sprayed into the polymer-lean vapor stream (c) using a spraying condensed vapor stream (i) upstream of the contacting of step B) and downstream of the separating of step A) with respect to the flow direction of the polymer-lean vapor stream (c). Preferably, the spraying condensed vapor stream (i) is compressed before being sprayed into the polymer-lean vapor stream (c).

In one embodiment of the process of the invention according to FIG. 2a, the spraying condensed vapor stream is fed from a first fresh source of condensed vapor composition. However, preferably, in step B) the polymer-comprising condensed vapor stream (e) is at least partially fed to the spraying condensed vapor stream (i). Preferably the spraying condensed vapor stream (i) is compressed using a pump (12). Optionally, a second source of fresh condensed vapor composition (Q2) is fed to the polymer-comprising condensed vapor stream (e). However, the preferred embodiment is without a second source of fresh condensed vapor composition (Q2).

This preferred embodiment of the process of the invention including the recirculation of condensed vapor stream (e) and subsequent spraying of the condensed vapor composition of said stream into the polymer-lean vapor stream (c) via a conduit for the spraying condensed vapor stream (i) and the first inlet (4) has the advantage that no or less fresh condensed vapor composition has to be introduced into the screening device (3) for spraying. As a result, material and energy is saved. Especially, as the spraying condensed vapor stream (i) still has elevated temperature, there is no need to heat it up again. Nevertheless, as the recirculated composition is already condensed, the temperature is also not too high, but ensures reliably that the polymer-lean vapor stream can reach its condensation point.

Screening Process According to FIG. 2b

In another preferred embodiment of the process of the invention according to FIG. 2b, the condensed vapor stream (e) is at least partially fed to the first condensed vapor stream (f). Furthermore, preferably, the polymer-comprising condensed vapor stream (e) is compressed before being fed to the first condensed vapor stream (f). Also in this preferred embodiment of the process of the invention according to FIG. 2b, optionally and preferably, a second source of fresh condensed vapor composition (Q2) is fed to the polymer-comprising condensed vapor stream (e).

The advantage of this embodiment is comparable to the advantage of the embodiment according to FIG. 2a. While the purpose of the recirculated stream is related to being contacted with the polymer-lean vapor stream (c) in the screening device (3) for the removal of entrained polymer, also in this embodiment the advantage is that no or less fresh condensed vapor composition has to be introduced into the screening device (3). As a result, material and energy is saved. Especially, as the first condensed vapor stream (f) still has elevated temperature, there is no need to heat it up again. Nevertheless, as the recirculated composition is already condensed, the temperature is also not too high, but ensures that entrained polymer is reliably removed from the polymer-lean vapor stream (c).

Screening Process According to FIG. 2c

In another preferred embodiment of the process of the invention according to FIG. 2c, a recycle condensed vapor stream (j) is introduced into step A). Preferably, the polymer-comprising condensed vapor stream (e) is at least partially fed to the recycle condensed vapor stream (j). Preferably the recycle condensed vapor stream (j) is compressed using a pump (12). Even more preferably, the recycle condensed vapor stream (j) is heated using a heater (13). Optionally and preferably, a second source of fresh condensed vapor composition (Q2) is fed to the polymer-comprising condensed vapor stream (e).

The advantage of this preferred embodiment is that at least parts of the polymer-comprising condensed vapor stream (e) are recycled back into the separating device (2). Hence, such a setup increases the overall separation efficiency of the combined first and screening devices. Furthermore, it removes the requirement of separating polymer and volatiles in the polymer-comprising condensed vapor stream (e).

Screening Process According to FIG. 2d

In another preferred embodiment of the process of the invention according to FIG. 2d, a heated condensed vapor stream (h) is contacted with the polymer-lean vapor stream (c), wherein the flow direction of the heated condensed vapor stream (h) is countercurrent to the flow direction of the polymer-lean vapor stream (c).

Preferably, the polymer-comprising condensed vapor stream (e) is at least partially fed to the heated condensed vapor stream (h). Preferably, the heated condensed vapor stream (h) is compressed using a pump (12). Even more preferably, the heated condensed vapor stream (h) is heated using a heater (13). Optionally and preferably, a second source of fresh condensed vapor composition (Q2) is fed to the polymer-comprising condensed vapor stream (e).

The advantage of the process according to FIG. 2d is that the conditions within the screening device (3) can be controlled. It is advantageous to keep the condensed vapor composition present in the screening device (3), the upper phase limit being indicated by (17), at the temperature of the boiling point. This ensures better vapor transportation and in particular increased separation efficiency. If the condensed vapor composition is not boiling, more vapor will be withdrawn from the screening device in condensed form, while it is preferred to withdraw as much as possible volatile compounds in the gaseous form to separate them from the polymer.

Screening Process According to FIG. 3

It should be understood that the modifications of step A) with respect to the polymer-comprising condensed vapor stream according to the embodiments of the process of the invention FIGS. 2a-d can be combined. As a particularly preferred embodiment of the process of the invention according to FIG. 3, all modifications with regard to the polymer-comprising condensed vapor stream (e) are combined.

Screening Process According to FIG. 4a

In another preferred embodiment of the process of the invention according to FIG. 4a, in step C) the clean vapor stream (d) is condensed and at least partially fed to the second condensed vapor stream (g). Preferably, a part of the clean vapor stream is withdrawn as a clean vapor phase (k).

The general advantage of the preferred embodiment according to FIG. 4a is that at least parts of the clean vapor composition stream (d) are recycled back into the second condensed vapor stream (g). The second condensed vapor stream (g) is used to provide the second contacting step between the polymer-lean vapor stream (c) and a condensed vapor stream to remove polymer still present in the polymer-lean vapor stream (c). By recycling part of the clean vapor stream (d) not only the need of an extra import of fresh condensed vapor composition is reduced, but also the energy withdrawn from the system by the clean vapor stream (d) is at least partially returned to the screening device (3).

Screening Process According to FIG. 4b

In an even more preferred embodiment of the process of the invention according to FIG. 4b, the clean vapor stream (d) is stored in a vessel after being condensed. Preferably, the clean vapor stream (d) is compressed after being fed from the vessel to the second condensed vapor stream (g).

The advantage of this embodiment is that the storage of the clean vapor stream (d) ensures reliable supply with condensed vapor.

Screening Process According to FIG. 5

The preferred embodiment of the process of the invention according to FIG. 5 is a combination of the modifications of the polymer-comprising stream (e) as shown in the embodiments of the process of the invention according to FIG. 3 and the embodiments of the process of the invention according to FIGS. 4a and 4b.

General Features of the Process of the Invention

In a preferable process according invention step A) is performed using a flash separator.

More preferably, steps B) and/or C) of the process of the present invention are performed using a washing column.

Preferably, the process according to the present invention is carried out at a temperature in the washing column between 30 and 240° C., preferably between 100 to 220° C., most preferably 130 to 200° C. Generally, the process of the invention is preferably carried out at temperatures, which ensure that the polymer is throughout the process in a molten state in the first washing column.

Preferably, the process according to the present invention is carried out at a pressure in the washing column between 0.0 and 15.0 barg.

Preferably, the process according to the present invention is carried out with a temperature of the clean vapor stream (d) between 90 and 200° C., preferably between 100 and 180° C., and most preferably between 120 and 160° C.

In an even more preferred embodiment of the invention, step B) is carried out multiple times in series. In a particularly preferred embodiment of the invention, step B) is carried out in that the clean vapor stream (d) of the first washing column is optionally again heated and fed to a new separator, where again the polymer lean vapor phase is treated with a washing column.

Generally, the process of the invention is preferably carried out at temperatures, which ensure that the polymer is throughout the process in a molten state in the second washing column.

In addition, preferably, the process according to the present invention is carried out treating a vapor lean phase produced in a next separating device (2') according to the present invention. The polymer-rich stream (b) from the separating device (2) is compressed again, heated and fed to the next separating device (2) producing a next polymer-lean vapor stream (c'). Because the composition of the polymer-rich vapor stream (b) to the next separating device (2') is different from the effluent stream (a) to the separating device (2), the process conditions are different for the next separating device (2'), where the flashing step and washing step takes place at a pressure in a third washing column between 0.0 and 6.0 barg, preferably between 0.1 and 2.0 barg, more preferably between 0.2 and 1.0 barg. These reduced pressures in view of the pressures applied in the first washing column have the advantage that also volatiles with higher molecular weight can be efficiently removed from the polymer-lean condensed vapor stream. Preferably, the process is carried out at a temperature of the next clean vapor stream (d') of the third washing column of between 50 and 130° C., preferably between 55 and 120° C., and most preferably between 60 and 110° C.

Use of the Screening Assembly of the Present Invention

The present invention is also directed to the use of a screening assembly according to the invention for preventing fouling in a polymerization process.

EXAMPLE

The example has been performed using a vertical set-up with a washing column to create intensive contact between the condensed vapor stream and the polymer-lean vapor stream. A setup according to FIG. 5 has been used, wherein the separating step was carried out using a flash separator. The polymer entrainment is discharged on gravity from the bottom of the washing column by polymer-comprising condensed vapor stream (e). The clean vapor stream (d) exits from the top of the washing column.

Before the washing column, solvent spraying is applied to ensure that the vapor is at its condensation point, because the polymer-lean vapor stream is overheated.

The polymer-lean vapor stream enters the washing column above the liquid bath level (17) and moves upward in counter flow to the falling condensed vapor stream. The washing column is filled with packings in between the liquid and gas distributors (10/11) to improve the contact between the polymer-lean vapor stream and the condensed vapor stream. In the example a high flow of condensed vapor stream has been applied in the bottom section to secure thorough particles removal (cleaning).

The washing column is operated at the boiling point of the vapor composition.

To enhance the separating efficiency, a second washing column is used connected in series to the clean vapor stream (e) of the first washing column.

First Washing Column

The operation conditions are set to have temperatures above the melting temperatures of the polymer.

For polymers produced from octene monomers, the melting temperatures range from around 40° C. for the lowest densities up to 130° C. for densities at around 940 kg/m³.

Hence, if the pressure in the first washing columns stays above 5 barg, it will always operate in a state with molten polymer (cf. Table 1).

TABLE 1

| Washing column operating temperatures | | |
| --- | --- | --- |
|  | Bottom temperature | Top temperature |
| Octene grades | 160-200° C. | 140-180° C. |

CLAUSES

1. A process for screening polymer from a polymer-lean stream, whereby the process comprises the steps of
   A) separating an effluent stream (a) comprising the polymer and a mixture of hydrocarbons into a polymer-rich stream (b) and the polymer-lean vapor stream (c);
   B) contacting the polymer-lean vapor stream (c) with a first condensed vapor stream (f), wherein the flow direction of the first condensed vapor stream (f) is countercurrent to the flow direction of the polymer-lean vapor stream (c) to produce a cleaned vapor stream (d) and a polymer-comprising condensed vapor stream (e).
2. The process according to clause 1 further comprising the step of:
   C) contacting the polymer-lean vapor stream (c) with a second condensed vapor stream (g) downstream to the contacting of step B) with respect to the flow direction of the polymer-lean vapor stream (c), wherein the flow direction of the second condensed vapor stream (g) is countercurrent to the flow direction of the polymer-lean vapor stream (c).
3. The process according to any of the preceding clauses, wherein a condensed vapor composition comprising mixture of hydrocarbons is sprayed into the polymer-lean vapor stream (c) using a spraying condensed vapor stream (i) upstream of the contacting of step B) and downstream of the separating of step A) with respect to the flow direction of the polymer-lean vapor stream (c), wherein the second condensed vapor stream (e) is partially fed to the spraying condensed vapor stream (i).
4. The process according to any of the preceding clauses, wherein in step B) the polymer-comprising condensed vapor stream (e) is fed to the first condensed vapor stream (f).
5. The process according to any of the preceding clauses, wherein a recycle condensed vapor stream (j) is introduced into step A), wherein the polymer-comprising condensed vapor stream (e) is at least partially fed to the recycle condensed vapor stream (j), and wherein the recycle condensed vapor stream (j) is heated using a heater (13).
6. The process according to any of the preceding clauses, wherein a heated condensed vapor stream (h) is contacted with the polymer-lean vapor stream (c), wherein the flow direction of the heated condensed vapor stream (h) is countercurrent to the flow direction of the polymer-lean vapor stream (c), wherein the polymer-comprising condensed vapor stream (e) is at least partially fed to the heated condensed vapor stream (h), and wherein the heated condensed vapor stream (h) is optionally heated using a heater (13).
7. The process according to any of the preceding clauses 2 to 6, wherein in step C) the cleaned vapor stream (d) is condensed and fed to the second condensed vapor stream (g).
8. A screening assembly comprising
   a separating device (2) connected to a conduit for an effluent stream (a) comprising a mixture of hydrocarbons, wherein the separating device (2) is configured to separate the effluent stream (a) into a polymer-rich stream (b) and a polymer-lean vapor stream (c), wherein the first separation device (2) comprises an inlet, a first outlet for withdrawing a polymer-rich stream (b), and a second outlet for withdrawing a polymer-lean vapor stream (c),
   a screening device (3) connected to the separating device (2) via a conduit for the polymer-lean vapor stream (c), wherein the screening device (3) comprises:
   a first inlet (4) connected to the conduit for the polymer-lean vapor stream (c),
   a first outlet (5) for withdrawing a cleaned vapor stream (d),
   a second outlet (6) for withdrawing a polymer-comprising condensed vapor stream (e), and
   at least one second inlet (7, 8) for introducing a condensed vapor stream (f, g)
   wherein the at least one second inlet (7,8) is positioned above the first inlet (4) and below the first outlet (5) with respect to the height of the screening device (3), and
   wherein the first inlet (4) is positioned above the second outlet (6) and below the at least one second inlet (7,8) with respect to the height of the screening device (3).
9. The screening assembly according to clause 8, wherein the at least one second inlet (7, 8) comprises
   a first second inlet (7) for introducing a first condensed vapor stream (f), and
   a second second inlet (8) for introducing a second condensed vapor stream (g),
   wherein the first second inlet (7) is positioned above the first inlet (4) and below the second second inlet (8) with respect to the height of the screening device (3), and
   wherein the second second inlet (8) is positioned above the first second inlet (7) and below the first outlet (5) with respect to the height of the screening device (3).
10. The screening assembly according to any of the preceding clauses 8 or 9, wherein the first inlet (4) is configured for spraying condensed vapor into the polymer-lean vapor stream (c) and wherein the polymer-comprising condensed vapor stream (e) connected to the second outlet (6) and a spraying condensed vapor stream (i) sprayed into the polymer-lean vapor stream (c) are fluidly connected, preferably fluidly connected via the pump (12)

11. The screening assembly according to any of the preceding clauses 8 to 10, wherein the polymer-comprising condensed vapor stream (e) connected to the second outlet (6) and the condensed vapor stream (f) connected to the first second inlet (7) are fluidly connected, preferably fluidly connected via a pump (12).

12. The screening assembly according to any of the preceding clauses 8 to 11, wherein the polymer-comprising condensed vapor stream (e) connected to the second outlet (6) and a recycle condensed vapor stream (j) connected to the separating device (2) are fluidly connected, preferably fluidly connected via the pump (12) and a heater (13).

13. The screening assembly according to any of the preceding clauses 8 to 12, further comprising a third inlet (9) for introducing a heated condensed vapor stream (h), and wherein the polymer-comprising condensed vapor stream (e) connected to the second outlet (6) and the heated condensed vapor stream (h) connected to the third inlet (9) are fluidly connected, preferably fluidly connected via the pump (12) and the heater (13).

14. The screening assembly according to any of the preceding clauses 8 to 13, further comprising a condenser (12) comprising an inlet and an outlet, wherein the first outlet (5) is fluidly connected to the inlet of the condenser (14) via a conduit for the cleaned vapor stream (d), wherein the outlet of the condenser (14) is fluidly connected to the second second inlet (8) via a conduit for the second condensed vapor stream (g).

15. Use of a screening assembly according to any of the preceding clauses 8 to 14 for preventing fouling.

The invention claimed is:

1. A process for screening polymer from a polymer-lean vapor stream, whereby the process comprises the steps of
   A) separating an effluent stream (a) comprising the polymer and a mixture of hydrocarbons into a polymer-rich stream (b) and the polymer-lean vapor stream (c); and
   B) contacting the polymer-lean vapor stream (c) with a first condensed vapor stream (f), wherein the flow direction of the first condensed vapor stream (f) is countercurrent to the flow direction of the polymer-lean vapor stream (c) to produce a cleaned vapor stream (d) and a polymer-comprising condensed vapor stream (e); wherein the polymer in the effluent stream (a) is molten.

2. The process according to claim 1 further comprising the step of:
   C) contacting the polymer-lean vapor stream (c) with a second condensed vapor stream (g) downstream to the contacting of step B) with respect to the flow direction of the polymer-lean vapor stream (c), wherein the flow direction of the second condensed vapor stream (g) is countercurrent to the flow direction of the polymer-lean vapor stream (c).

3. The process according to claim 1, wherein a condensed vapor composition comprising a mixture of hydrocarbons is sprayed into the polymer-lean vapor stream (c) using a spraying condensed vapor stream (i) upstream of the contacting of step B) and downstream of the separating of step A) with respect to the flow direction of the polymer-lean vapor stream (c), wherein the second condensed vapor stream (e) is partially fed to the spraying condensed vapor stream (i).

4. The process according to claim 1, wherein in step B) the polymer-comprising condensed vapor stream (e) is fed to the first condensed vapor stream (f).

5. The process according to claim 1, wherein a recycle condensed vapor stream (j) is introduced into step A), wherein the polymer-comprising condensed vapor stream (e) is at least partially fed to the recycle condensed vapor stream (j), and wherein the recycle condensed vapor stream (j) is heated using a heater (13).

6. The process according to claim 1, wherein a heated condensed vapor stream (h) is contacted with the polymer-lean vapor stream (c), wherein the flow direction of the heated condensed vapor stream (h) is countercurrent to the flow direction of the polymer-lean vapor stream (c), wherein the polymer-comprising condensed vapor stream (e) is at least partially fed to the heated condensed vapor stream (h), and wherein the heated condensed vapor stream (h) is optionally heated using a heater (13).

7. The process according to claim 2, wherein in step C) the cleaned vapor stream (d) is condensed and fed to the second condensed vapor stream (g).

8. The process according to claim 1, wherein said effluent stream (a) in step A) is from a solution polymerization process.

9. The process according to claim 1, wherein said polymer comprised in said effluent stream (a) of step A) is an olefin homo- or copolymer.

10. The process according to claim 1, wherein temperatures used in step A) are between 10° and 400° C.

11. The process according to claim 1, wherein step A) is carried out using a flash separator.

12. The process according to claim 1, wherein step B) is performed using a washing column at a temperature in the washing column between 10° and 220° C. and at a pressure in the washing column between 0.0 and 15 barg.

13. The process according to claim 1, wherein the polyolefin homo- or copolymer is a polyethylene or polypropylene homo- or copolymer.

* * * * *